(12) United States Patent
Nagshain (10) Patent No.: US 7,406,563 B1
(45) Date of Patent: Jul. 29, 2008

(54) METHOD AND APPARATUS FOR ACCESSING A STRIPED CONFIGURATION OF DISKS

(75) Inventor: Madhuresh Nagshain, Milpitas, CA (US)

(73) Assignee: Adaptec, Inc., Milpitas, CA (US)

( * ) Notice: Subject to any disclaimer, the term of this patent is extended or adjusted under 35 U.S.C. 154(b) by 522 days.

(21) Appl. No.: 11/054,659

(22) Filed: Feb. 8, 2005

Related U.S. Application Data (60) Provisional application No. 60/551,916, filed on Mar. 9, 2004.

(51) Int. Cl.
*G06F 12/16* (2006.01)
(52) U.S. Cl. ..................... 711/114; 711/111
(58) Field of Classification Search ............. None
See application file for complete search history.

(56) References Cited

U.S. PATENT DOCUMENTS 6,775,794 B1 * 8/2004 Horst et al. ............. 714/42
2003/0145167 A1 * 7/2003 Tomita ................. 711/114
2004/0133743 A1 * 7/2004 Ito et al. ................ 711/114

* cited by examiner

*Primary Examiner*—Than Nguyen
(74) *Attorney, Agent, or Firm*—Martine Penilla & Gencarella, LLP (57) ABSTRACT

Broadly speaking, a method and an apparatus is provided for processing access commands directed to a striped configuration of disks. More specifically, the method and apparatus determines a physical block address corresponding to a logical address in a redundant array of independent disks level 0 (RAID 0) system. Bit-level operations are incorporated to determine a disk in the RAID 0 system and a block number on the disk that corresponds to a particular logical address. Since the bit-level operations replace traditionally required division and modulo operations, the method and apparatus provides for more efficient processing of access commands directed to the RAID 0 system.

24 Claims, 4 Drawing Sheets

Fig. 1
(Prior Art)

|  | Stripe 0 | Stripe 1 | Stripe 2 |
|---|---|---|---|
| Disk 0: | LBAs 0 to 63<br>DBAs 0 to 63 | LBAs 256 to 319<br>DBAs 64 to 127 | LBAs 512 to 575<br>DBAs 128 to 191 |
| Disk 1: | LBAs 64 to 127<br>DBAs 0 to 63 | LBAs 320 to 383<br>DBAs 64 to 127 | LBAs 576 to 639<br>DBAs 128 to 191 |
| Disk 2: | LBAs 128 to 191<br>DBAs 0 to 63 | LBAs 384 to 447<br>DBAs 64 to 127 | LBAs 640 to 703<br>DBAs 128 to 191 |
| Disk 3: | LBAs 192 to 255<br>DBAs 0 to 63 | LBAs 448 to 511<br>DBAs 64 to 127 | LBAs 704 to 767<br>DBAs 128 to 191 |

METHOD AND APPARATUS FOR ACCESSING A STRIPED CONFIGURATION OF DISKS

CROSS REFERENCE TO RELATED APPLICATIONS

This application claims the benefit of U.S. Provisional Application No. 60/551,916, filed Mar. 9, 2004.

BACKGROUND OF THE INVENTION

1. Field of the Invention

The present invention relates generally to digital data storage system operation. More specifically, the present invention relates to a method and an apparatus for processing an access command directed to a striped configuration of disks.

2. Description of the Related Art

The operating system (OS) of a computer controls the delivery of read and write commands to a storage medium (e.g., disk drive). In some cases, the OS views an abstraction of the storage medium rather than the physical storage medium. For example, the OS may view a logical drive representing a portion of the physical storage medium. In another example, the OS may view a logical drive representing a combination of different physical storage mediums. A redundant array of independent disks level 0 (RAID 0) represents a system in which a logical drive is defined in a striped configuration across a number of disk drives.

Figure 1:
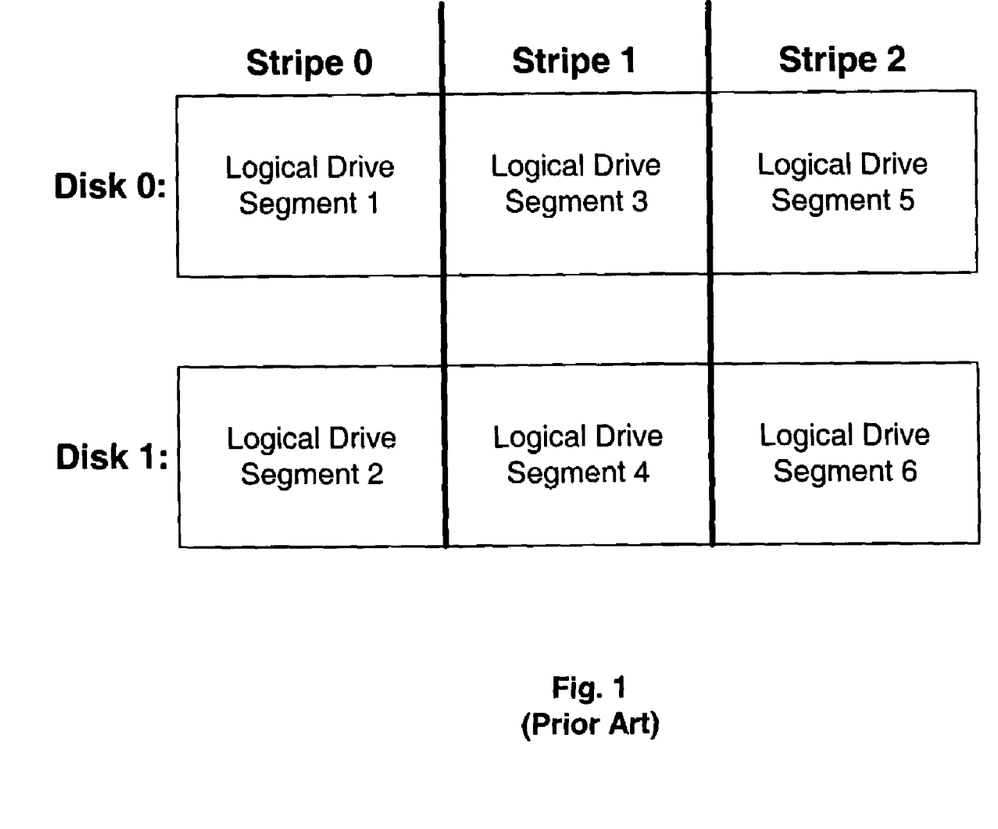
FIG. 1 is an illustration showing an example of how a logical drive is defined across a number of disks in a RAID 0 system, in accordance with the prior art.

FIG. 1 is an illustration showing an example of how a logical drive is defined across a number of disks in a RAID 0 system, in accordance with the prior art. The example of FIG. 1 includes two disk drives, Disk 0 and Disk 1. The logical drive is defined in a striped configuration across Disk 0 and Disk 1. In the example of FIG. 1, the logical drive is represented by three stripes, Stripes 0-3. Each disk drive in the RAID 0 system contains one or more segments of the logical drive. However, due to the striping configuration, the logical drive segments contained on a single disk drive are not contiguous. For example, Disk 0 of FIG. 1 contains logical drive segments 1, 3, and 5. It should be appreciated that the logical drive segments contained on a single disk drive will become increasingly separated in RAID 0 systems implementing a larger number of disk drives. Therefore, in a RAID 0 system, determining a physical block address on a disk drive that corresponds to a particular logical address can be difficult.

A prior art method for determining a physical block address in a RAID 0 system corresponding to a particular logical address involves division, multiplication, and modulus operations. More specifically, the disk containing the logical address ($D_0$) is calculated by the following formula:

$$D_0 = (L/S) \bmod N$$

where L is the logical address of interest, S is the number of blocks in a stripe, and N is the number of disks in the RAID 0 system. Additionally, the physical block address ($L_0$) on the disk containing the logical address is calculated by the following formula:

$$L_0 = ((L/S)/N)*S + (L \bmod S).$$

With respect to the above formulas for $D_0$ and $L_0$, the operator "/" refers to calculation of a quotient after dividing a numerator by a denominator. The operator "mod" refers to calculation of a remainder after dividing a numerator by a denominator. The operator "*" refers to multiplication of two operands.

The prior art method described above for determining the physical block address corresponding to the logical address in a RAID 0 system involves performing two division operations and two modulo operations. Thus, each time a logical address is to be associated with a physical block address (i.e., each time a read or a write operation is performed) two division operations and two modulo operations must be performed. Hence, the prior art method described above is computationally expensive. Furthermore, due to the division and modulo operations, the prior art method described above is difficult to implement as hardware.

In view of the foregoing, there is a need for a method and apparatus to process access commands directed to a RAID 0 system without requiring division and modulo operations to be performed.

SUMMARY OF THE INVENTION

Broadly speaking, a method and an apparatus is disclosed for processing access commands directed to a striped configuration of disks. More specifically, the present invention provides a method and an apparatus for determining a physical block address corresponding to a logical address in a redundant array of independent disks level 0 (RAID 0) system. The present invention incorporates bit-level operations to determine a disk in the RAID 0 system and a block number on the disk that correspond to a particular logical address. Thus, the method and apparatus of the present invention do not require use of division or modulo operations to determine the physical block address of interest. Therefore, the present invention allows for more efficient processing of access commands directed to the RAID 0 system. Additionally, the present invention allows the process of determining the physical block address corresponding to the logical address within the RAID 0 system to be easily implemented in hardware.

In one embodiment, a method for processing an access command directed to a striped configuration of disks is disclosed. The method includes deriving a set of parameters based on specifications of the striped configuration of disks. The set of parameters represents inputs for processing the access command. The method also includes receiving the access command, wherein the access command is directed to a starting address within the striped configuration of disks. The method continues by performing a first sequence of bit-level operations to determine a disk of the striped configuration of disks that contains the starting address. The first sequence of bit-level operation is performed using a first subset of parameters from the set of parameters. The method further includes performing a second sequence of bit-level operations to determine a block number corresponding to the starting address, wherein the block number represents a block on the disk containing the starting address. The second sequence of bit-level operations is performed using a second sub-set of parameters from the set of parameters.

In another embodiment, a method for processing an access command directed to a striped configuration of disks is disclosed. The method includes establishing a first shift value and a first mask value. Each of the first shift value and the first mask value are associated with a number of blocks per stripe in the striped configuration of disks. The method also includes establishing a second shift value and a second mask value. Each of the second shift value and the second mask value are associated with a number of disks in the striped configuration of disks. The method further includes establishing a third mask value that is associated with the second shift value and the number of blocks per stripe in the striped configuration of disks. The method continues by receiving a disk access command directed to a starting logical address. A disk containing the starting logical address is determined using the first shift value and the second mask value. A block number corresponding to the starting logical address is determined using the third mask value, the second shift value, and the first mask value. The block number is defined relative to the disk containing the starting logical address.

In another embodiment, an apparatus for processing an access command directed to a starting logical address within a RAID 0 system is disclosed. The apparatus includes a first arrangement of circuitry configured to establish a first shift value and a first mask value. Both the first shift value and the first mask value are associated with a number of blocks per stripe in the RAID 0 system. The apparatus also includes a second arrangement of circuitry configured to establish a second shift value and a second mask value. Both the second shift value and the second mask value are associated with a number of disks in the RAID 0 system. The apparatus further includes a third arrangement of circuitry configured to establish a third mask value associated with the second shift value and the number of blocks per stripe in the RAID level 0 system. A fourth and a fifth arrangement of circuitry are also provided in the apparatus. The fourth arrangement of circuitry is configured to determine a disk containing the starting logical address using the first shift value and the second mask value. The fifth arrangement of circuitry is configured to determine a block number corresponding to the starting logical address using the third mask value, the second shift value, and the first mask value. The block number is defined relative to the disk containing the starting logical address.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

The present invention provides a method and an apparatus for processing access commands directed to a striped configuration of disks. More specifically, the present invention provides a method and an apparatus for determining a physical block address corresponding to a logical address in a redundant array of independent disks level 0 (RAID 0) system. The present invention incorporates bit-level operations to determine a disk in the RAID 0 system and a block number on the disk that correspond to a particular logical address.

Thus, the method and apparatus of the present invention do not require use of division or modulo operations to determine the physical block address of interest. Therefore, the present invention allows for more efficient processing of access commands directed to the RAID 0 system. Additionally, the present invention allows the process of determining the physical block address corresponding to the logical address within the RAID 0 system to be easily implemented in hardware.

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 2:
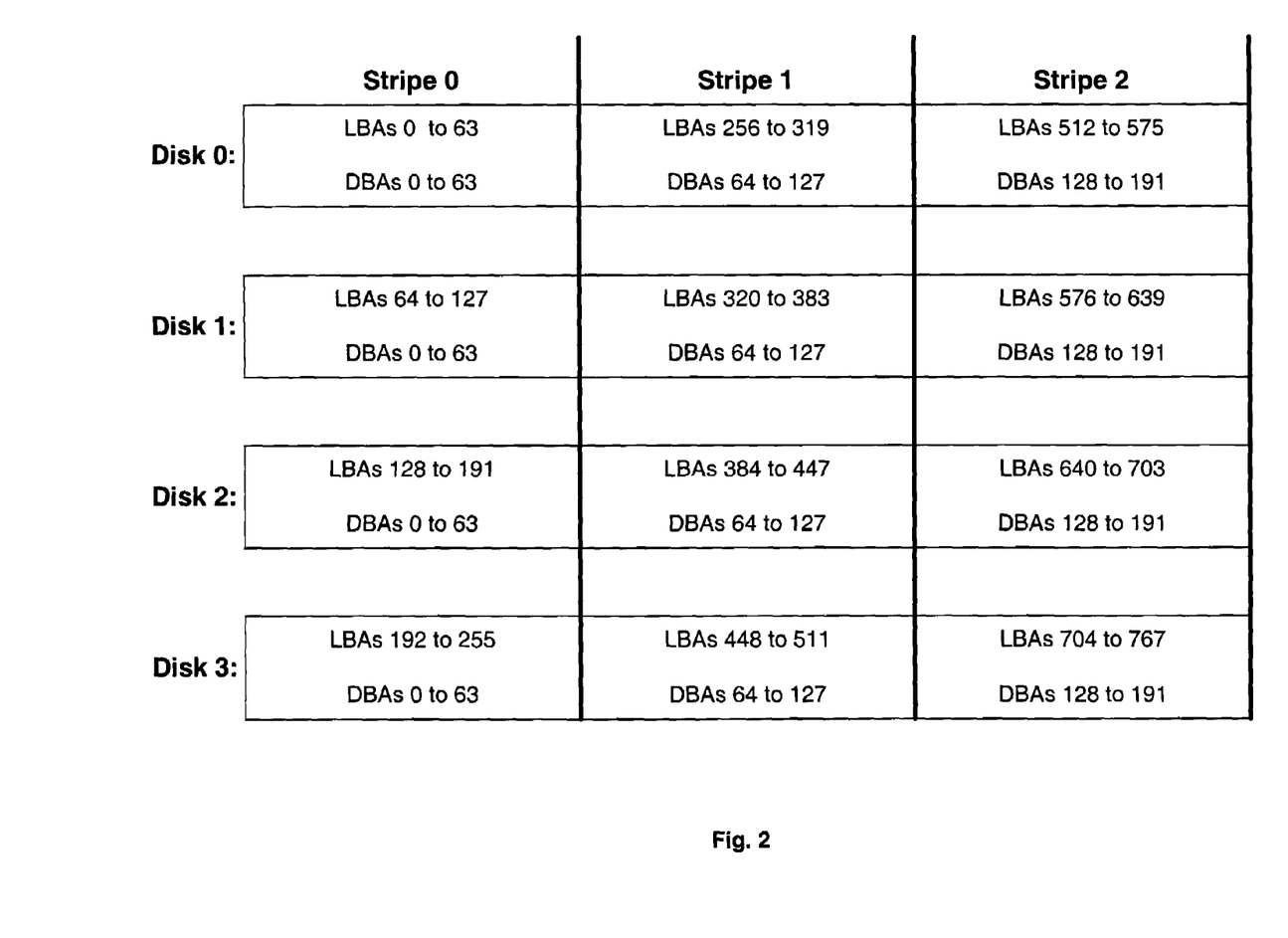
FIG. 2 is an illustration showing an example of a RAID 0 configuration, in accordance with one embodiment of the present invention.

FIG. 2 is an illustration showing an example of a RAID 0 configuration, in accordance with one embodiment of the present invention. The RAID 0 configuration of FIG. 2 is presented to facilitate description of the present invention. It should be understood that the present invention is not limited to the RAID 0 configuration shown in FIG. 2. The RAID 0 configuration includes four disks (Disk 0 through Disk 3). Each disk contains disk block addresses (DBAs) 0 through 191. A logical drive is defined in a striped configuration across Disks 0 through 3. A stripe size is defined to contain 64 blocks. Thus, logical block addresses (LBAs) 0 to 63 reside in Stripe 0 on Disk 0. LBAs 64 to 127 reside in Stripe 0 on Disk 1. LBAs 128 to 191 reside in Stripe 0 on Disk 2. LBAs 192 to 255 reside in Stripe 0 on Disk 3. Following LBA 255 on Disk 3, the stripe reverts back to Disk 0. Hence, LBAs 256 to 319 reside in Stripe 1 on Disk 0. LBAs 320 to 383 reside in Stripe 1 on Disk 1. The striping continues across the disks in the aforementioned manner such that a total of three stripes (Stripe 0 through Stripe 2) are defined. Thus, in the example of FIG. 2, the logical drive is defined to contain LBAs 0 through 767.

A disk access command issued from an operating system to a RAID 0 system is generally directed to a starting logical address (i.e., starting LBA) in the logical drive defined across the disks of the RAID 0 configuration. The terms "starting address", "starting logical address", and "starting logical block address" are used interchangeably in this specification and all refer to an address in the logical drive defined across the disks of the RAID 0 configuration. To execute the disk access command, it is necessary to determine which disk in the RAID 0 configuration and which physical block address on the disk (i.e., DBA) corresponds to the starting logical address. The present invention provides a method for determining the disk containing the starting logical block address and the physical block address on the disk corresponding to the starting logical block address. The method of the present invention uses bit-level operations to determine the disk and physical block address corresponding to the starting logical address. Therefore, the method of the present invention avoids the problems of the prior art by not implementing division and modulo operations that are computationally expensive and difficult to implement in hardware.

The method of the present invention can be used in conjunction with RAID 0 configurations satisfying the following two criteria:
  1) a number of disks in the RAID 0 configuration is equal to 2 to the power X ($2^X$), where X in an integer; and 2) a number of blocks per stripe in the RAID 0 configuration is equal to 2 to the power Y ($2^Y$), where Y is an integer.

For example, with respect to FIG. 2, the RAID 0 configuration includes 4 disks (i.e., $2^X$, where X=2) and 64 blocks per stripe (i.e., $2^Y$, where Y=6). Thus, the method of the present invention can be used in conjunction with the example RAID 0 configuration of FIG. 2. It should be appreciated that FIG. 2 is exemplary and is not meant to be limiting with respect to the present invention.

Figure 3:
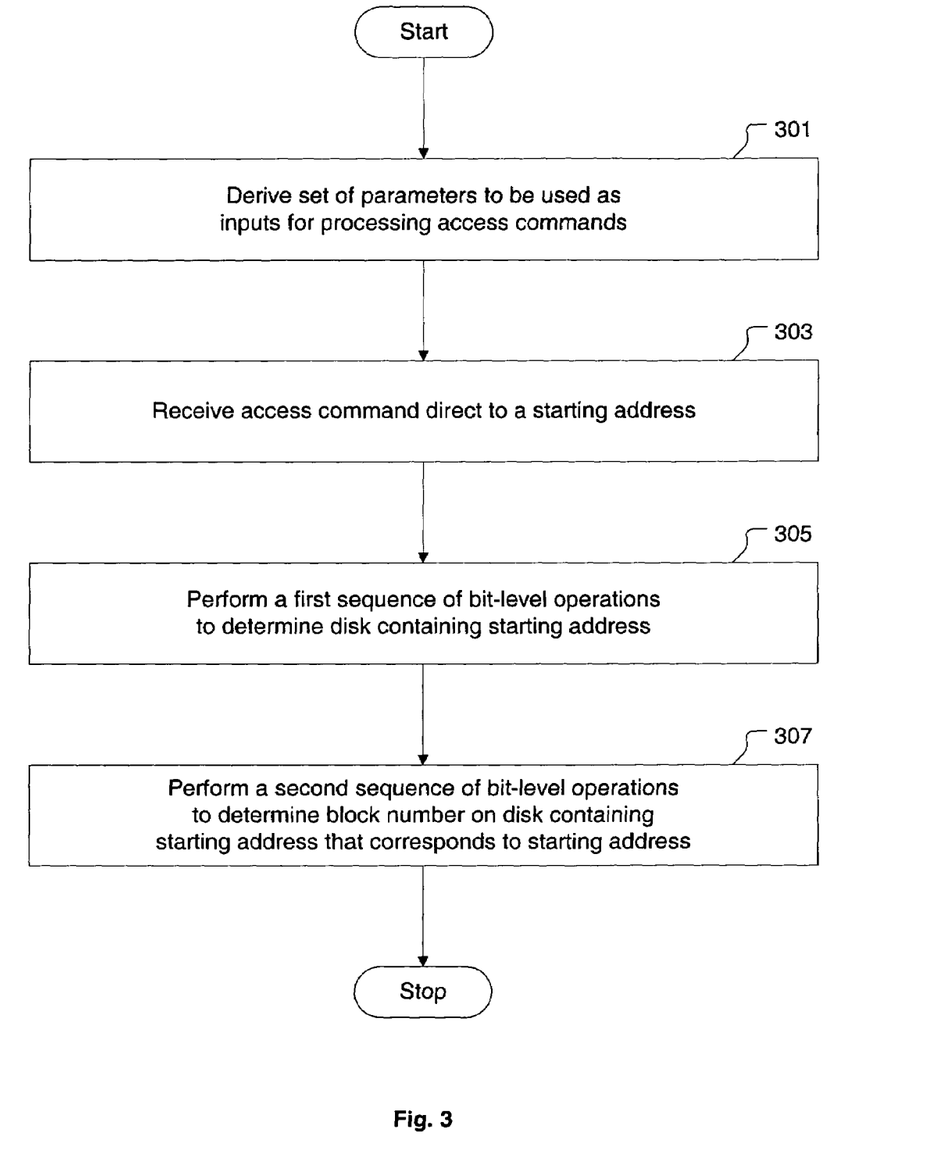
FIG. 3 is an illustration showing a flowchart of the method for determining the disk containing the starting logical block address and the physical block address on the disk corresponding to the starting logical block address, in accordance with one embodiment of the present invention.

FIG. 3 is an illustration showing a flowchart of the method for determining the disk containing the starting logical block address and the physical block address on the disk corresponding to the starting logical block address, in accordance with one embodiment of the present invention. The method includes an operation 301 in which a set of parameters are derived based on specifications of the striped configuration of disks (i.e., RAID 0 system). More specifically, the specifications of the striped configuration of disks used to derive the set of parameters includes a number of disks (N) and a number block per stripe (S). The values of N and S are established during configuration of the RAID 0 system. The set of parameters derived from N and S are presented in Table 1. With respect to Table 1, the operator "<<" refers to a bit-wise left shift. For example, "a <<b" represents a bit-wise left shift of "a" (represented as a bit pattern) by a number of bits equal to "b". Also, with respect to Table 1, the "bit-wise NOT" operation refers to a standard NOT operation performed on each bit of a bit pattern. For example, a bit-wise NOT of "0010" is "1101".

TABLE 1

Set of Parameters Derived from Specifications of RAID 0 Configuration

| Parameter | Formula Used to Derive Parameter |
|---|---|
| SSHIFT | $S = 2^{SSHIFT}$ |
| SMASK | SMASK = (S − 1) |
| DSHIFT | $N = 2^{DSHIFT}$ |
| DMASK | DMASK = (N − 1) |
| BOTHMASK | BOTHMASK = bit-wise NOT of [(S << DSHIFT) − 1] |

The SSHIFT parameter represents a number of bits to shift a bit pattern. As shown in Table 1, the SSHIFT parameter is an integer power of 2 necessary to equal a number of blocks per stripe in the striped configuration of disks (i.e., S). The SMASK parameter represents a bit pattern corresponding to one less than S. The DSHIFT parameter is similar to the SSHIFT parameter in that the DSHIFT parameter also represents a number of bits to shift a bit pattern. However, as shown in Table 1, the DSHIFT parameter is an integer power of 2 necessary to equal a number of disks in the striped configuration of disks (i.e., N). The DMASK parameter represents a bit pattern corresponding to one less than N. The BOTHMASK parameter represents a bit pattern corresponding to a bit-wise NOT of a first quantity, wherein the first quantity is equal to one less than a second quantity, and the second quantity is equal to a bit-wise left-shift of S by a number of bits being equal to DSHIFT. In one embodiment, each of the parameters described with respect to Table 1 are derived during an initialization process and stored in a memory for subsequent and repeated use.

The method of FIG. 3 continues with an operation 303 in which an access command directed to a starting logical block address is received for processing. In one embodiment, the access command is communicated from an application through an operating system to a RAID 0 driver for processing. In this embodiment, the method of the present invention is implemented by executing a series of program instructions contained on a computer readable media. In another embodiment, the access command is communicated from an application through an operating system to a RAID 0 controller for processing. In this embodiment, the method of the present invention is implemented by operating an arrangement of circuitry configured to perform the necessary bit-level operations. Regardless of the particular embodiment, however, the set of parameters as described with respect to Table 1 are used to determine the disk containing the starting logical block address and the physical block address on the disk corresponding to the starting logical block address.

The method continues with an operation 305 in which a first sequence of bit-level operations are performed to determine the disk ($D_0$) of the striped configuration of disks containing the starting logical block address. The first sequence of bit-level operations use a first subset of parameters from the set of parameters described in Table 1. More specifically, the first subset of parameters includes the SSHIFT parameter and the DMASK parameter. The first sequence of bit-level operations to determine $D_0$ are presented in Table 2. With respect to Table 2, "L" represents the starting logical block address to be accessed. With respect to Table 2, the operator ">>" refers to a bit-wise right shift. For example, "a >>b" represents a bit-wise right shift of "a" (represented as a bit pattern) by a number of bits equal to "b". Also, with respect to Table 2, the "&" operator refers to a bit-wise conjunction (i.e., "AND") operation of a first bit pattern with a second bit pattern. For example, "0110 & 1101" equates to "0100".

TABLE 2

Bit-level Operations to Determine $D_0$ $D_0$ = (L >> SSHIFT) & DMASK

With reference to Table 2, the first sequence of bit-level operations includes an operation to generate a first bit pattern representing a bit-wise right-shift of the starting logical block address (L) by a number of bits being equal to SSHIFT. Thus, the first bit pattern represents a result of (L>>SSHIFT). The first sequence of bit-level operations further includes an operation to generate a second bit pattern representing a bit-wise conjunction of the first bit pattern with DMASK. Thus, the second bit pattern represents a number of the disk containing the starting logical block address ($D_0$) in the striped configuration of disks.

The method continues with an operation 307 in which a second sequence of bit-level operations are performed to determine the physical block address ($L_0$) corresponding to the starting logical block address (L). The physical block address is defined relative to the disk containing the starting logical block address. For example, referring to FIG. 2, if L resides on Disk 1, $L_0$ will represent the DBA on Disk 1 corresponding to L. The second sequence of bit-level operations use a second subset of parameters from the set of parameters described in Table 1. More specifically, the second subset of parameters includes the BOTHMASK parameter, the DSHIFT parameter, and the SMASK parameter. The second sequence of bit-level operations to determine $L_0$ are presented in Table 3. With respect to Table 3, the "&" and ">>" operators are the same as described with respect to Table 2.

TABLE 3

Bit-level Operations to Determine $L_0$ $L_0$ = [(L & BOTHMASK) >> DSHIFT] + (L & SMASK)

With reference to Table 3, the second sequence of bit-level operations includes an operation to generate a first bit pattern representing a bit-wise conjunction of the starting logical block address with the BOTHMASK parameter. The second sequence of bit-level operations also includes an operation to generate a second bit pattern representing a bit-wise right-shift of the first bit pattern by a number of bits being equal to the DSHIFT parameter. The second sequence of bit-level operations further includes an operation to generate a third bit pattern representing a bit-wise conjunction of the starting logical block address with the SMASK parameter. Finally, the second sequence of bit-level operation includes an operation to generate a sum of the second bit pattern and the third bit pattern. Thus, the sum represents a number of the physical block address (i.e., DBA) corresponding to the starting logical block address.

Figure 4:
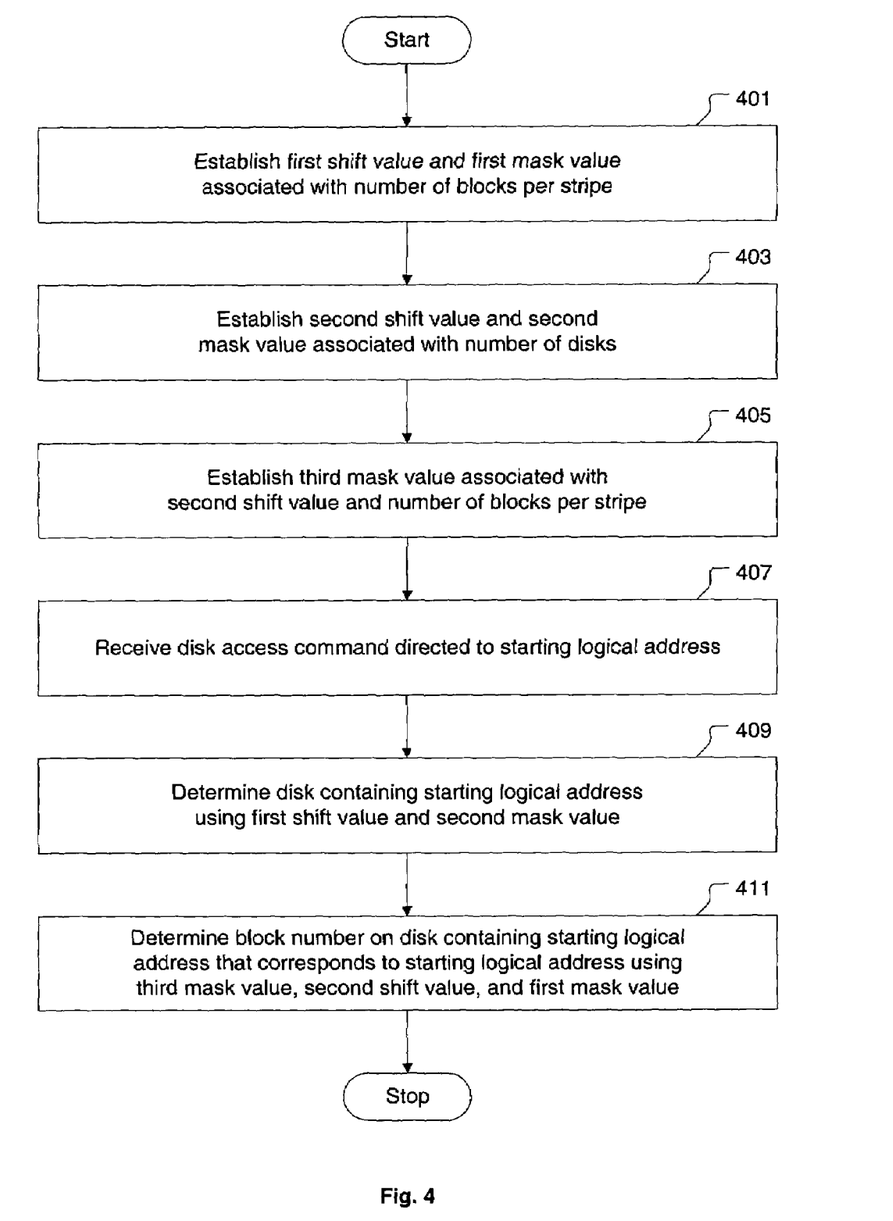
FIG. 4 is an illustration showing a method for processing an access command directed to a striped configuration of disks, in accordance with one embodiment of the present invention.

FIG. 4 is an illustration showing a method for processing an access command directed to a striped configuration of disks, in accordance with one embodiment of the present invention. The striped configuration of disks includes a number of disks equal to an integer power of 2. The striped configuration of disks also includes a number of blocks per stripe equal to an integer power of 2. In one embodiment, the striped configuration of disks is a RAID 0 system.

The method includes an operation 401 for establishing a first shift value and a first mask value. Both the first shift value and the first mask value are associated with the number of blocks per stripe in the striped configuration of disks. The first shift value corresponds to the integer power of 2 required to equal the number of blocks per stripe. The first mask value corresponds to one less than the number of blocks per stripe. With reference to Table 1 and FIG. 3, the first shift value and the first mask value correspond to SSHIFT and SMASK, respectively.

The method continues with an operation 403 for establishing a second shift value and a second mask value. Both the second shift value and the second mask value are associated with the number of disks in the striped configuration of disks. The second shift value corresponds to the integer power of 2 required to equal the number of disks. The second mask value is one less than the number of disks. With reference to Table 1 and FIG. 3, the second shift value and the second mask value correspond to DSHIFT and DMASK, respectively.

The method continues with an operation 405 for establishing a third mask value associated with the second shift value and the number of blocks per stripe in the striped configuration of disks. The third mask value corresponds to a result obtained from performing a bit-wise NOT operation of a first quantity, wherein the first quantity is equal to one less than a second quantity representing a bit-wise left shift of the number of blocks per stripe by a number of bits being equal to the second shift value. With reference to Table 1 and FIG. 3, the third mask value corresponds to BOTHMASK.

In one embodiment, each of the first shift value, the first mask value, the second shift value, the second mask value, and the third mask value are stored in a memory for repeated use in processing multiple access commands. The method further includes an operation 407 for receiving a disk access command that is directed to a starting logical block address in the striped configuration of disks.

The method continues with an operation 409 for determining a disk containing the starting logical block address using the first shift value and the second mask value. The operation 409 includes generating an intermediate value representing a right shift of the starting logical block address by a number of bits equal to the first shift value. The operation 409 also includes performing a bit-wise conjunction (i.e., "AND") operation using the intermediate value and the second mask value. The bit-wise conjunction operation generates a disk number corresponding to the disk containing the starting logical block address. The disk number is based on a disk numbering convention wherein the first disk is numbered 0, the second disk is numbered 1, etc.

The method continues with an operation 411 for determining a physical block number corresponding to the starting logical block address, wherein the physical block number is defined relative to the disk within which it resides. The operation 411 uses the third mask value, the second shift value, and the first mask value to determine the physical block number. More specifically, operation 411 includes generating a first intermediate value by performing a bit-wise conjunction operation using the starting logical block address and the third mask value. The operation 411 also includes generating a second intermediate value by right shifting the first intermediate value by a number of bits equal to the second shift value. The operation 411 further includes generating a third intermediate value by performing a bit-wise conjunction operation using the starting logical block address and the first mask value. The physical block number corresponding to the logical block address is then obtained by summing the second intermediate value and the third intermediate value.

Table 4 shows an example implementation of the method described in each of FIGS. 3 and 4. The example method implementation shown in Table 4 is based on the example RAID 0 configuration of FIG. 2 and an access command directed to a starting logical block address of 393 (i.e., L=393). The RAID 0 specifications include a number of blocks per stripe equal to 64 (i.e., S=64) and a number of disks equal to 4 (i.e., N=4). Also, the example shown in Table 4 is based on use of 16-bit integers. It should be appreciated, however, that the method of the present invention can be implemented with any size bit-word (e.g., 8-bit, 16-bit, 32-bit, 64-bit, 128-bit, etc. . . . ). As shown in Table 4, the method of the present invention correctly determines the disk containing the logical block address of interest to be disk 2 (i.e., $D_0$=2). Also, the method of the present invention correctly determines the physical block address corresponding to the logical block address of interest to be block 73 on disk 2 (i.e., $L_0$=73).

TABLE 4

Example Implementation of Method for Determining $D_0$ and $L_0$

Input Data: L = 393 = 0000000110001001, S = 64, N = 4
Expected Results: $D_0$ = 2, $L_0$ = 73
Calculation of SSHIFT:
S = $2^{(SSHIFT)}$, 64 = $2^{(SSHIFT)}$, SSHIFT = 6
Calculation of SMASK:
SMASK = (S − 1) = 63 = 0000000000111111
Calculation of DSHIFT:
N = $2^{(DSHIFT)}$, 4 = $2^{(DSHIFT)}$, DSHIFT = 2
Calculation of BOTHMASK:
BOTHMASK = bit-wise NOT of [ (S << DSHIFT) − 1]
(S << DSHIFT) = (64 << 2) = (0000000001000000 << 2) = 0000000100000000
[(S << DSHIFT) − 1] = [(0000000100000000) − 1] = 0000000011111111
BOTHMASK = 0000011100000000
Calculation of DMASK:

TABLE 4-continued

Example Implementation of Method for Determining $D_0$ and $L_0$

DMASK = (N − 1) = 3 = 0000000000000011
Calculation of $L_0$:
$L_0$ = [(L & BOTHMASK) >> DSHIFT] + (L & SMASK)
(L & BOTHMASK) = (0000000110001001 &
0000011100000000) = 0000000100000000
[(L & BOTHMASK) >> DSHIFT] = (0000000100000000 >>
2) = 0000000001000000 = 64
(L & SMASK) = (0000000110001001 & 0000000000111111) =
0000000000001001 = 9
$L_0$ = [(L & BOTHMASK) >> DSHIFT] + (L & SMASK) =
[64] + (9) = 73
Calculation of $D_0$:
$D_0$ = (L >> SSHIFT) & DMASK
(L >> SSHIFT) = (0000000110001001 >> 6) = 0000000000000110
$D_0$ = (L >> SSHIFT) & DMASK =
(0000000000000110 & 0000000000000011)
$D_0$ = 0000000000000010 = 2

The method of the present invention for determining the disk ($D_0$) containing the starting logical block address and determining the physical block address ($L_0$) on the disk that corresponds to the starting logical block address is implemented without use of division and modulo operations. Rather, the method of the present invention uses bit-level operations to determine the disk and physical block address corresponding to the starting logical block address of interest. Since bit-level operations can be performed efficiently in computing systems, the method of the present invention provides efficient RAID 0 input/output processing performance. Additionally, bit-level operations are relatively easy to implement as hardware using logic gates and associated circuitry. Therefore, the method of the present invention allows the determination of the disk and physical block address corresponding to the starting logical block address of interest to be more easily implemented in hardware. In following, the method of the present invention furthers a progression to full RAID 0 implementation in hardware (i.e., RAID-on-a-chip) without a need for an external processor to perform complex division and modulo operations.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A method for processing an access command directed to a striped configuration of disks, comprising:
    deriving a set of parameters based on specifications of the striped configuration of disks, the set of parameters representing inputs for processing the access command;
    receiving the access command, the access command being directed to a starting address within the striped configuration of disks;
    performing a first sequence of bit-level operations using a first subset of parameters from the set of parameters to determine a disk of the striped configuration of disks containing the starting address, wherein the first sequence of bit-level operations includes at least one bit-wise shift operation and at least one bit-wise conjunction operation; and
    performing a second sequence of bit-level operations using a second subset of parameters from the set of parameters to determine a block number on the disk containing the starting address, the block number corresponding to the starting address, wherein the second sequence of bit-level operations includes at least one bit-wise shift operation and at least one bit-wise conjunction operation.

2. A method for processing an access command directed to a striped configuration of disks as recited in claim 1, wherein the set of parameters includes SSHIFT, SMASK, DSHIFT, DMASK, and BOTHMASK parameters.

3. A method for processing an access command directed to a striped configuration of disks as recited in claim 2, wherein the SSHIFT parameter is a number of bits to shift a bit pattern, the SSHIFT parameter being an integer power of 2 necessary to equal a number of blocks per stripe in the striped configuration of disks (S) such that $S=2^{(SSHIFT)}$,
    the SMASK parameter is a bit pattern representing one less than S,
    the DSHIFT parameter is a number of bits to shift a bit pattern, the DSHIFT parameter being an integer power of 2 necessary to equal a number of disks in the striped configuration of disks (N) such that $N=2^{(DSHIFT)}$,
    the DMASK parameter is a bit pattern representing one less than N, and
    the BOTHMASK parameter is a bit pattern representing a bit-wise NOT of a first quantity being equal to one less than a second quantity representing a bit-wise left-shift of S by a number of bits being equal to DSHIFT such that BOTHMASK=Bit-wise NOT of [(S<<DSHIFT)−1].

4. A method for processing an access command directed to a striped configuration of disks as recited in claim 2, wherein the first subset of parameters includes SSHIFT and DMASK and the second subset of parameters includes BOTHMASK, DSHIFT, and SMASK.

5. A method for processing an access command directed to a striped configuration of disks as recited in claim 2, wherein the first sequence of bit-level operations includes, an operation to generate a first bit pattern, the first bit pattern representing a bit-wise right-shift of the starting address by a number of bits being equal to SSHIFT, and an operation to generate a second bit pattern, the second bit pattern representing a bit-wise AND of the first bit pattern with DMASK, the second bit pattern representing the disk containing the starting address.

6. A method for processing an access command directed to a striped configuration of disks as recited in claim 2, wherein the second sequence of bit-level operations includes, an operation to generate a first bit pattern, the first bit pattern representing a bit-wise AND of the starting address with BOTHMASK, an operation to generate a second bit pattern representing a bit-wise right-shift of the first bit pattern by a number of bits being equal to DSHIFT, an operation to generate a third bit pattern representing a bit-wise AND of the starting address with SMASK, and an operation to generate a sum of a first value represented by the second bit pattern and a second value represented by the third bit pattern, the sum representing the block number on the disk containing the starting address.

7. A method for processing an access command directed to a striped configuration of disks as recited in claim 1, wherein the first sequence of bit-level operations does not include a division operation or a modulo operation, and wherein the second sequence of bit-level operations does not include a division operation or a modulo operation.

8. A method for processing an access command directed to a striped configuration of disks, comprising:

establishing a first shift value and a first mask value associated with a number of blocks per stripe in the striped configuration of disks;

establishing a second shift value and a second mask value associated with a number of disks in the striped configuration of disks;

establishing a third mask value associated with the second shift value and the number of blocks per stripe in the striped configuration of disks;

receiving a disk access command directed to a starting logical address;

determining a disk containing the starting logical address using the first shift value and the second mask value;

determining a block number corresponding to the starting logical address using the third mask value, the second shift value, and the first mask value, the block number being defined relative to the disk containing the starting logical address.

9. A method for processing an access command directed to a striped configuration of disks as recited in claim 8, wherein the number of blocks per stripe is equal to an integer power of 2, the first shift value being equal to the integer power.

10. A method for processing an access command directed to a striped configuration of disks as recited in claim 8, wherein the first mask value is one less than the number of blocks per stripe, the first mask value being represented in binary format.

11. A method for processing an access command directed to a striped configuration of disks as recited in claim 8, wherein the number of disks is equal to an integer power of 2, the second shift value being equal to the integer power.

12. A method for processing an access command directed to a striped configuration of disks as recited in claim 8, wherein the second mask value is one less than the number of disks.

13. A method for processing an access command directed to a striped configuration of disks as recited in claim 8, wherein the third mask value represents a bit-wise NOT of a first quantity, the first quantity being equal to one less than a second quantity, the second quantity representing a bit-wise left shift of the number of blocks per stripe by a number of bits being equal to the second shift value.

14. A method for processing an access command directed to a striped configuration of disks as recited in claim 8, wherein the first shift value, the first mask value, the second shift value, the second mask value, and the third mask value are stored in a memory for repeated use in processing multiple access commands.

15. A method for processing an access command directed to a striped configuration of disks as recited in claim 8, wherein determining the disk containing the starting logical address includes, right shifting the starting logical address by a number of bits equal to the first shift value to generate an intermediate value, and performing a bit-wise conjunction operation using the intermediate value and the second mask value to generate a disk number corresponding to the disk containing the starting logical address, the disk number being based on a numbering of disks in the striped configuration of disks beginning with 0.

16. A method for processing an access command directed to a striped configuration of disks as recited in claim 8, wherein determining the block number corresponding to the starting logical address includes, performing a bit-wise conjunction operation using the starting logical address and the third mask value to generate a first intermediate value, right shifting the first intermediate value by a number of bits equal to the second shift value to generate a second intermediate value, performing a bit-wise conjunction operation using the starting logical address and the first mask value to generate a third intermediate value, and summing the second intermediate value and the third intermediate value to generate the block number corresponding to the starting logical address.

17. An apparatus for processing an access command directed to a starting logical address within a redundant array of independent disks (RAID) level 0 system, comprising:

a first arrangement of circuitry configured to establish a first shift value and a first mask value associated with a number of blocks per stripe in the RAID level 0 system;

a second arrangement of circuitry configured to establish a second shift value and a second mask value associated with a number of disks in the RAID level 0 system;

a third arrangement of circuitry configured to establish a third mask value associated with the second shift value and the number of blocks per stripe in the RAID level 0 system;

a fourth arrangement of circuitry configured to determine a disk containing the starting logical address using the first shift value and the second mask value; and a fifth arrangement of circuitry configured to determine a block number corresponding to the starting logical address using the third mask value, the second shift value, and the first mask value, the block number being defined relative to the disk containing the starting logical address.

18. An apparatus for processing an access command directed to a starting logical address within a redundant array of independent disks (RAID) level 0 system as recited in claim 17, wherein the number of blocks per stripe is equal to an integer power of 2, the first arrangement of circuitry including circuitry for determining the integer power, the first shift value being equal to the integer power.

19. An apparatus for processing an access command directed to a starting logical address within a redundant array of independent disks (RAID) level 0 system as recited in claim 17, wherein the first arrangement of circuitry includes circuitry for subtracting one from the number of blocks per stripe to establish the first mask value.

20. An apparatus for processing an access command directed to a starting logical address within a redundant array of independent disks (RAID) level 0 system as recited in claim 17, wherein the number of disks is equal to an integer power of 2, the second arrangement of circuitry including circuitry for determining the integer power, the second shift value being equal to the integer power.

21. An apparatus for processing an access command directed to a starting logical address within a redundant array of independent disks (RAID) level 0 system as recited in claim 17, wherein the second arrangement of circuitry includes circuitry for subtracting one from the number of disks to establish the second mask value.

22. An apparatus for processing an access command directed to a starting logical address within a redundant array of independent disks (RAID) level 0 system as recited in claim 17, wherein the third arrangement of circuitry includes circuitry for performing a bit-wise NOT of a first quantity to establish the third mask value, the third arrangement of circuitry including circuitry for subtracting one from a second quantity to generate the first quantity, the third arrangement of circuitry including circuitry for generating the second quantity by performing a bit-wise left shift of the number of blocks per stripe by a number of bits being equal to the second shift value.

23. An apparatus for processing an access command directed to a starting logical address within a redundant array of independent disks (RAID) level 0 system as recited in claim 17, wherein the fourth arrangement of circuitry includes,
   circuitry configured to perform a bit-wise right shift of the starting logical address by a number of bits equal to the first shift value to generate an intermediate value, and
   circuitry configured to perform a bit-wise conjunction operation using the intermediate value and the second mask value to generate a disk number corresponding to the disk containing the starting logical address, the disk number being based on a numbering of disks in the striped configuration of disks beginning with 0.

24. An apparatus for processing an access command directed to a starting logical address within a redundant array of independent disks (RAID) level 0 system as recited in claim 17, wherein the fifth arrangement of circuitry includes,
   circuitry configured to perform a bit-wise conjunction operation using the starting logical address and the third mask value to generate a first intermediate value,
   circuitry configured to perform a bit-wise right shift of the first intermediate value by a number of bits equal to the second shift value to generate a second intermediate value,
   circuitry configured to perform a bit-wise conjunction operation using the starting logical address and the first mask value to generate a third intermediate value, and
   circuitry configured to sum the second intermediate value and the third intermediate value to generate the block number corresponding to the starting logical address.

* * * * *